US008173737B2

(12) United States Patent
Scholz et al.

(10) Patent No.: US 8,173,737 B2
(45) Date of Patent: May 8, 2012

(54) ADHESIVES

(75) Inventors: Mario Scholz, Gruendau (DE); Juergen Meyer, Stockstadt (DE); Juergen Heym, Hoerstein (DE); Pia Buckel, Bruchkoebel (DE)

(73) Assignee: Evonik Degussa GmbH, Essen (DE)

( * ) Notice: Subject to any disclaimer, the term of this patent is extended or adjusted under 35 U.S.C. 154(b) by 25 days.

(21) Appl. No.: 12/597,917

(22) PCT Filed: May 6, 2008

(86) PCT No.: PCT/EP2008/055565
§ 371 (c)(1),
(2), (4) Date: Oct. 28, 2009

(87) PCT Pub. No.: WO2008/141929
PCT Pub. Date: Nov. 27, 2008

(65) Prior Publication Data
US 2010/0137485 A1    Jun. 3, 2010

(30) Foreign Application Priority Data
May 22, 2007   (DE) .................... 10 2007 024 099

(51) Int. Cl.
*C08K 3/36*    (2006.01)

(52) U.S. Cl. ........ 524/492; 428/403; 428/405; 524/543; 524/556; 524/557; 524/560; 524/571; 524/588; 524/589; 524/594; 524/601; 524/609

(58) Field of Classification Search .......... None
See application file for complete search history.

(56) References Cited

U.S. PATENT DOCUMENTS

| | | | |
|---|---|---|---|
| 5,665,156 A | 9/1997 | Ettlinger et al. | |
| 6,124,392 A * | 9/2000 | Heisler et al. | 524/492 |
| 6,750,273 B2 * | 6/2004 | Chao | 523/212 |
| 6,830,811 B2 * | 12/2004 | Chao | 428/405 |
| 7,332,144 B2 * | 2/2008 | Konya et al. | 423/335 |
| 7,625,975 B2 * | 12/2009 | Barfurth et al. | 524/571 |
| 8,022,130 B2 * | 9/2011 | Nowak et al. | 524/493 |
| 2005/0171268 A1 | 8/2005 | Scholz et al. | |
| 2005/0215668 A1 * | 9/2005 | Scholz et al. | 523/216 |
| 2006/0142472 A1 * | 6/2006 | Hirai et al. | 524/588 |
| 2007/0202245 A1 * | 8/2007 | Gantner et al. | 427/2.1 |
| 2008/0113162 A1 * | 5/2008 | Barthel et al. | 428/195.1 |
| 2009/0018260 A1 * | 1/2009 | Correia et al. | 524/588 |

FOREIGN PATENT DOCUMENTS

| | | |
|---|---|---|
| CN | 1678698 A | 10/2005 |
| EP | 672731 | 9/1995 |
| EP | 1 736 505 | 12/2006 |
| GB | 1 425 575 | 2/1976 |
| WO | 2004 005393 | 1/2004 |
| WO | WO 2004/020536 A1 | 3/2004 |
| WO | 2006 072407 | 7/2006 |

OTHER PUBLICATIONS

Office Action issued Aug. 1, 2011 in Chinese Patent Application No. 200880016724.8 (English translation only).
Feb. 6, 2012 Taiwanese Office Action issued (7pp.) issued in corresponding Taiwan Patent Application No. 097118378.

* cited by examiner

*Primary Examiner* — Marc Zimmer
(74) *Attorney, Agent, or Firm* — Oblon, Spivak, McClelland, Maier & Neustadt, L.L.P.

(57) ABSTRACT

Adhesive, comprising silanized, structurally modified, pyrogenically prepared silicas containing on their surface fixed vinyl groups or vinylsilyl groups, with hydrophobic groups, such as trimethylsilyl and/or dimethylsilyl and/or monomethylsilyl, additionally being fixed on the surface.

11 Claims, No Drawings

ADHESIVES

The invention provides adhesives which comprise silanized, structurally modified, pyrogenically prepared silicas. The invention further provides for the use of structurally modified, pyrogenically prepared silicas in adhesives.

An adhesive is defined as a non-metallic material which is able to join adherends by surface adhesion and internal strength. In the prior art there are numerous different adhesives known, the great majority of the adhesives used having a composition based on organic compounds. A distinction is made essentially between physically setting adhesives and chemically curing adhesives. The physically setting adhesives are those in which the final adhesive substance, frequently a polymer, is used as it is and then a physical process causes the adhesive to solidify.

Known accordingly, for example, are hotmelt adhesives, dispersion-based adhesives, wet adhesives containing organic solvents, and contact adhesives. A feature common to all of these types of adhesive is that first the adhesive is applied in a processable form and then solidification occurs as a result, for example, of evaporation of the solvent or of cooling.

In the case of the chemically curing adhesives, individual building blocks are applied and subsequently, by means of a chemical reaction of the individual building blocks, a new product is formed and undergoes solidification. Among the reactive adhesives a distinction is made between 2-component and 1-component systems. In the case of the 2-component systems, the adhesives are applied from separate constituents and solidify through a chemical reaction. In the case of 1-component adhesives, the adhesive cures in a chemical reaction, as a result of a change in the ambient conditions—for example, temperature increase, ingress of air, evaporation, moisture or atmospheric oxygen.

The group of the chemically curing adhesives includes, for example, cyanoacrylate adhesives, methyl methacrylate adhesives, anaerobically curing adhesives, radiation-curing adhesives, phenol-formaldehyde resin adhesives, silicones, silane-crosslinked polymer adhesives, polyimide adhesives, epoxy resin adhesives and polyurethane adhesives. An overview of the various adhesives can be found in Ullmann's Enzyklopädie der Chemie, 4th edition, volume 14, page 227 ff. (1997).

Also known is the use of different additives in adhesives; among others, for example, pyrogenic (fumed) silicas, which are effective thixotropic agents, are used in adhesives based on epoxy resins (Degussa Pigments brochure series (2001) Nos. 27 and 54).

Pyrogenically prepared silicas possessing silanized surfaces are known from the prior art. EP 0 672 731 A1 describes silanized silicas. The silicas described therein are also not structurally modified.

A disadvantage associated with the use of such silicas is that they can be used only at a low concentration, since otherwise the adhesive is thickened to such a great extent that it is no longer possible to ensure processability. This means that only small amounts of pyrogenic silicas can be used in the adhesives, and, therefore, the desired thixotropic effect is not adequately ensured.

This disadvantage is particularly significant when the aim is to achieve high levels of filling in the adhesives in order to improve properties, such as fracture toughness, impact strength, scratch and abrasion resistance, contraction characteristics, thermal expansion and thermal stability of the adhesive. In that situation it is only possible to add insufficient amounts of pyrogenic silicas, since the adhesive becomes too thick and can therefore no longer be processed.

The technical problem addressed by the invention is therefore that of providing adhesives into which fairly large amounts of pyrogenic silica can be incorporated, for the purpose of improving the rheological properties, without thickening of the adhesive occurring, and with the adhesive remaining processable.

This technical problem is solved according to the invention by means of an adhesive which comprises silanized, structurally modified, pyrogenically prepared silicas containing on their surface fixed vinyl groups or vinylsilyl groups, with hydrophobic groups, such as trimethylsilyl and/or dimethylsilyl and/or monomethylsilyl, additionally being fixed on the surface. They can have the following physicochemical properties:

| | |
|---|---|
| BET surface area $m^2/g$: | 25-400 |
| Average primary particle size nm: | 5-50 |
| pH: | 3-10 |
| Carbon content %: | 0.1-10 |
| DBP number %: | <200 or not determinable |

Silanized silicas are known from the prior-art DE 102 39 424 A1, where they are used in coating materials in order to improve the scratch resistance of the coating's surface. EP 0 672 731 A1 likewise discloses silanized pyrogenic silicas, but those silicas are not structurally modified and are used as thickeners for coating materials and resins.

It was surprisingly observed that the structurally modified, pyrogenically prepared silicas according to the invention do not cause any thickening in adhesives, contrary to the prior art described in EP 0 672 731 A1, but instead can be introduced in fairly large amounts into adhesive without a strongly thickening effect occurring. It has been found that it is more particularly the structural modification, in conjunction with the specific silanized groups, that is responsible for this effect being obtained.

Pyrogenically prepared silicas are typically prepared by means of high-temperature hydrolysis from silicon tetrachloride, hydrogen and oxygen. Silicas prepared by temperature hydrolysis can be used for the adhesives according to the invention, and have the physicochemical data shown in Table 1 in the hydrophilic state prior to the silanization and structural modification. From Table 1, the pyrogenically prepared silicas Aerosil 200, Aerosil 150 and Aerosil 300 are preferred. Particularly preferred is the pyrogenically prepared silica Aerosil 300.

TABLE 1

| | Aerosil 90 | Aerosil 130 | Aerosil 150 | Aerosil 200 | Aerosil 300 | Aerosil 380 | Aerosil OX 50 | Aerosil TT 600 |
|---|---|---|---|---|---|---|---|---|
| Properties of pyrogenic silicas prior to silanization | | | | | | | | |
| Attitude towards water | | | | hydrophilic | | | | |
| Appearance | | | | loose white powder | | | | |
| BET surface area[1] $m^2/g$ | 90 ± 15 | 130 ± 25 | 150 ± 15 | 200 ± 25 | 300 ± 30 | 380 ± 30 | 50 ± 15 | 200 ± 50 |
| Average primary particle size nm | 20 | 16 | 14 | 12 | 7 | 7 | 40 | 40 |

TABLE 1-continued

Properties of pyrogenic silicas prior to silanization

| | Aerosil 90 | Aerosil 130 | Aerosil 150 | Aerosil 200 | Aerosil 300 | Aerosil 380 | Aerosil OX 50 | Aerosil TT 600 |
|---|---|---|---|---|---|---|---|---|
| Tapped density[2]) | | | | | | | | |
| normal product g/l | about 80 | about 50 | about 50 | about 50 | about 50 | about 50 | about 130 | about 60 |
| compacted product g/l (suffix "V") | — | about 120 | about 120 | about 120 | about 120 | about 120 | — | — |
| Loss on drying[3]) (2 hours at 1000° C.) % on leaving the supply plant | <1.0 | <1.5 | <0.5[9]) | <1.5 | <1.5 | <1.5 | <1.5 | <2.5 |
| Loss on ignition[4])[7]) (2 hours at 1000° C.) % | <1 | <1 | <1 | <1 | <2 | <2.5 | <1 | <2.5 |
| pH[5]) (in 4% aqueous dispersion) | 3.6-4.5 | 3.6-4.3 | 3.6-4.3 | 3.6-4.3 | 3.6-4.3 | 3.6-4.3 | 3.8-4.8 | 3.6-4.5 |
| $SiO_2$[8]) % | >99.8 | >99.8 | >99.8 | >99.8 | >99.8 | >99.8 | >99.8 | >99.8 |
| $Al_2O_3$[8]) % | <0.05 | <0.05 | <0.05 | <0.05 | <0.05 | <0.05 | <0.08 | <0.05 |
| $Fe_2O_3$[8]) % | <0.003 | <0.003 | <0.003 | <0.003 | <0.003 | <0.003 | <0.01 | <0.003 |
| $TiO_2$[8]) % | <0.03 | <0.03 | <0.03 | <0.03 | <0.03 | <0.03 | <0.03 | <0.03 |
| $HCl$[8])[9]) % | <0.025 | <0.025 | <0.025 | <0.025 | <0.025 | <0.025 | <0.025 | <0.025 |
| Sieve residue[6]) (Mocker method, 45 μm) % | <0.05 | <0.05 | <0.05 | <0.05 | <0.05 | <0.05 | <0.2 | <0.05 |

[1])DIN 66131
[2])DIN ISO 787/XI, JIS K 5101/18 (unsieved)
[3])DIN ISO 787/II, ASTM D 280, JIS K 5101/21
[4])DIN 55 921, ASTM D 1208, JIS K 5101/23
[5])DIN ISO 787/IX, ASTM D 1208, JIS K 5101/24
[6])DIN ISO 787/XVIII, JIS K 5101/20
[7])based on the substance dried at 105° C. for 2 hours
[8])based on the substance calcined at 1000° C. for 2 hours
[9])HCl content is a constituent of the loss on ignition Pyrogenic silicas of this kind are known from, for example, DE 102 39 424 A1. Pyrogenic silicas are also described in Winnacker-Küchler, Chemische Technologie, volume 3 (1983), 4th edition, page 77 and in Ullmann's Enzyklopädie der technichen Chemie, 4th edition (1982), volume 21, page 462 ff.

The surface modification with organosilanes can be carried out by spraying the silicas first, if appropriate, with water and then with the surface modifier. The water used may have been acidified with an acid, hydrochloric acid for example, to a pH of 7 to 1. If two or more surface modifiers are used, they may be applied jointly, but separately, in succession, or as a mixture. The surface modifier or modifiers may be in solution in suitable solvents. When spraying is at an end, mixing may continue for a further 5 to 30 minutes.

The mixture is subsequently treated thermally at a temperature of 20 to 400° C. over a period of 0.1 to hours. The thermal treatment may take place under inert gas, such as nitrogen, for example.

An alternative method of surface modification of the silicas can be carried out by treating the silicas with the surface modifier in vapour form and then thermally treating the mixture at a temperature of 50 to 800° C. over a period of 0.1 to 6 hours. The thermal treatment may take place under inert gas, such as nitrogen, for example.

The temperature treatment may also take place in a plurality of stages at different temperatures.

The surface modifier or modifiers can be applied using single-fluid, dual-fluid or ultrasonic nozzles.

The surface modification can be carried out continuously or batchwise in heatable mixers and dryers with spraying devices. Suitable apparatus may include, for example the following: ploughshare mixers, plate dryers, fluidized-bed dryers or fluid-bed dryers.

Any compounds which are suitable for fixing vinyl or vinylsilyl and trimethylsilyl and/or dimethylsilyl and/or monomethylsilyl groups on the silica surface can be used as surface modifiers. In particular, the vinylsilyl and methylsilyl groups can be applied to the silica via a compound such as 1,3-divinyl-1,1,3,3-tetramethyldisilazane or dimethylvinylsilanol, for example, or a plurality of compounds such as vinyltriethoxysilane and hexamethyldisilazane or trimethylsilanol, for example.

The structural modification of the silicas thus prepared takes place subsequently by means of mechanical action. Structural modification may if appropriate be followed by grinding. If appropriate, after the structural modification and/or grinding, a heat treatment may take place.

The structural modification may take place for example with a ball mill or with a continuously operating ball mill. Grinding may take place, for example, by means of an air-jet mill, toothed-disc mill or pinned-disc mill. Heat treatment may take place batchwise, in a drying oven, for example, or continuously, in a fluid bed or fluidized bed, for example. Heat treatment may take place under inert gas, nitrogen for example.

The adhesives preferably contain 1% to 40%, preferably 2% to 30%, more preferably 4% to 10% by weight of the structurally modified, pyrogenically prepared silicas.

In one preferred embodiment the adhesive comprises as its base polymer compounds selected from the group consisting of epoxy resins, unsaturated polyester resins, polyurethane, silane-terminated polymers, vinyl ester resins, acrylates, polyvinyl acetate, polyvinyl alcohol, polyvinyl ethers, ethylene-vinyl acetate, ethylene-acrylic acid copolymers, polyvinyl acetates, polystyrene, polyvinyl chloride, styrene-butadiene rubber, chloroprene rubber, nitrile rubber, butyl rubber, polysulphide, polyethylene, polypropylene, fluorinated hydrocarbons, polyamides, saturated polyesters and copolyesters, phenol-formaldehyde resins, cresol-/resorcinol-formaldehyde resins, urea-formaldehyde resins, melamine-formaldehyde resins, polyimides, polybenzimidazoles, polysulphones or mixtures thereof.

In one preferred embodiment the structurally modified, pyrogenically prepared silica can also be introduced into an epoxy resin, with this resin then being admixed to the adhesive.

Adhesives are products which, in accordance with their respective chemical composition and the physical state prevailing at the time of application to the adherends, allow wetting of the surfaces and, in their bonded joint, form the adhesive layer needed for the transmission of force between the adherends. Like sealants, adhesives comprise similar components in addition to the base polymer, such as, for example, solvents (ketones for example), water, fillers (chalk for example), thixotropic agents (pyrogenic silica for example), adhesion promoters (silanes for example), colour pastes (pigment-grade carbon black for example) and also further additives (for example, catalysts, ageing inhibitors).

In comparison to sealants, adhesives have higher tensile shear strengths and lower extension values; in other words, adhesives are hard to elastic, and sealants are elastic to plastic.

Epoxy resins are used preferably as base polymers for adhesives. Epoxy resins are prepared for example by condensing 2,2-bis(4-hydroxyphenyl)propane and epichlorohydrin in a basic medium. Depending on the equivalents of both reactants that are employed, the products are glycidyl ethers with different molar masses. In recent years, epoxy resins from bisphenol F, novolak epoxy resins, and cycloaliphatic and heterocyclic epoxy resins have also acquired importance.

Since epoxy resins on their own are poor film formers, molecular enlargement is required by means of suitable crosslinking agents. Examples of crosslinking agents used for epoxy resins include polyamines, polyaminoamides, carboxylic anhydrides and dicyandiamides. Among the amine curing agents a distinction is made between aliphatic, cycloaliphatic, aromatic and araliphatic polyamines. Curing takes place without elimination of reaction products. It generally involves the addition of a reactive hydrogen atom to the epoxide group, with formation of a hydroxyl group.

Unsaturated polyester resins are used preferably as base polymers for adhesives. They are obtained by polycondensation of unsaturated and saturated dicarboxylic or polycarboxylic acids with alcohols. Given a suitable reaction regime, the double bonds remain in the acid and/or alcohol and permit polymerization reactions with unsaturated monomers, styrene for example. Unsaturated dicarboxylic acids used with preference are as follows: maleic anhydride, maleic acid, fumaric acid.

Saturated dicarboxylic acids used with preference are as follows: ortho-phthalic acid and ortho-phthalic anhydride, isophthalic acid, terephthalic acid, tetrahydrophthalic acid, hexahydrophthalic acid, adipic acid, azelaic acid, sebacic acid, hexachloroendo-methylenetetrahydrophthalic acid, tetrabromophthalic acid.

Glycols used with preference are as follows: propylene 1,2-glycol, ethylene glycol, butylene glycol, neopentyl glycol, 2,2,4-trimethylpentane-1,3-diol, dibromoneopentyl glycol, diethylene glycol, triethylene glycol, dipropylene glycol, pentaerythritol diallyl ether, dicyclopentadiene.

Monomers for the crosslinking used with preference are as follows: styrene, alpha-methylstyrene, meta- and para-methylstyrene, methyl methacrylate, diallyl phthalate, triallyl cyanurate.

This listing does not exhaust the number of possible starting materials. The skilled person will be able, depending on the raw material situation, to use other compounds as well. Furthermore, the addition of dicyclopentadiene is customary, and the reactivity of the resins is modified as a result. The "unsaturated polyester resins" produced can be used as such or in dilution with reactive monomers. Reactive monomers are styrene, stilbene, esters of acrylic acid, esters of methacrylic acid, diallyl phthalate, and other unsaturated compounds, provided that they have a sufficiently low viscosity and adequate miscibility with the unsaturated polyester resin.

Polyurethane resins are used preferably as base polymers for adhesives. The polyurethanes are derived from isocyanic acid. As an extremely reactive compound, it undergoes addition very readily with compounds which possess an active hydrogen atom. In the course of this reaction the double bond between the nitrogen and the carbon is cleaved, the active hydrogen becoming attached to the nitrogen and the oxygen-combining radical to the carbon, to form a urethane group. In order to obtain higher molecular mass crosslinked polyurethanes of the kind needed for adhesive and sealant layers, it is necessary to provide reaction partners which are starting products having at least two functional groups, such as di- or triisocyanates, for example diphenylmethane 4,4-diisocyanate (MDI) with polymeric fractions, or reaction product of tolylene diisocyanate (TDI) and polyols, and polyhydric alcohols (diols or polyols, compounds having two or more hydroxyl functions in the molecule). Alcohols of this kind may also be present, for example, in the form of saturated polyesters, which are prepared with an excess of polyalcohols.

Two-component reactive adhesives are composed of a low molecular mass polyisocyanate and a likewise relatively low molecular mass polyesterpolyol, for example polyalkylene polyadipate. Following the combining of the two components, urethane groups are formed in the adhesive or in the adhesive layer.

One-component reactive adhesives are composed of a relatively high molecular mass polyurethane, which sets by reacting with atmospheric moisture. In principle the situation here as well is one of two inter-reacting chemical components, but only one physical component is supplied for adhesive processing. Since, on reaction with moisture, the simple low molecular mass polyisocyanates form relatively hard and brittle adhesive layers with low strength values, the one-component systems start from precrosslinked polymers, known as prepolymers. These compounds are prepared from relatively high molecular mass polyols with a stoichiometric excess of isocyanate. In this way, the compounds present already possess urethane bonds, but in addition possess reactive isocyanate groups as well, which are amenable to the reaction with moisture. The reaction with water proceeds with the formation of a urea bond. The primary amines formed in the course of the decomposition reaction react immediately with further isocyanate groups to form polyureas. In the case of the one-component systems, therefore, the fully cured polymer contains not only urethane compounds but also urea compounds.

Solvent-borne polyurethane adhesives are available as physically setting systems and as chemically reacting systems. In the case of the physically setting systems the polymer takes the form of a high molecular mass hydroxyl polyurethane, the solvent used being, for example, methyl ethyl ketone. The chemically reacting systems include additionally hydroxyl polyurethane and a further polyisocyanate as crosslinker and as a second component.

Dispersion-based adhesives comprise a high molecular mass polyurethane in dispersion in water.

In the case of thermally activable polyurethane adhesives the isocyanate component is in "capped" or "blocked" form in a compound which eliminates the isocyanate component only at a relatively high temperature.

Reactive polyurethane hotmelt adhesives are prepared by using relatively high molecular mass, crystallizing and meltable diol and isocyanate components. These components are applied as hotmelt adhesives at temperatures from around 70° C. to 120° C. to the adherends. After cooling, the bond acquires a sufficient initial strength, which allows rapid further processing. Subsequently, as a result of additional moisture exposure of the reactive isocyanate groups still present, crosslinking then takes place via urea bonds, to form the adhesive layer polymer.

Silane-terminated polymers are used preferably as base polymers for adhesives.

The term "silane-terminated polymers" or else "silane-modified polymers" embraces all of those prepolymers which, either at the chain ends or pendently, carry silyl groups having at least one hydrolysable bond, but whose polymer backbone does not contain the siloxane bond typical of siloxanes.

In general it can be assumed that any silane-modified polymer, irrespective of its chemical structure, will have the qualities of a hybrid: the curing is similar to that of the silicones, and the other properties are shaped by the various possible polymer backbones between the silyl groups. Silane-terminated or silane-modified polymers can be classed in terms of their structure between the polyurethanes and the silicones.

The synthesis of the silane-modified polymer encompasses a number of stages. The initial basis is dihydric or trihydric polyoxypropylene glycol, which is converted into the corresponding bisallyl compound. That compound is reacted to form the desired end product, bis(3-(methyldimethoxysilyl)propyl)polyoxy-propylene.

The silyl groups thereby introduced into the chains crosslink with one another via mechanisms of the kind known in silicone chemistry, i.e., with elimination of small amounts of water or methanol, and so give an elastic and insoluble network.

There are further possible methods of obtaining sealants and adhesives based on silicone-modified polymers: for example, the reaction of NCO-terminated prepolymers with correspondingly reactive aminosilanes or mercaptosilanes. The polymer backbone may contain all of the conceivable rational structural elements, such as ether, ester, thioether or disulphide bridges. The converse case, in which an $NH_2$-, SH- or OH-terminated prepolymer can be reacted with an isocyanate silane, is likewise conceivable. The addition of terminal mercapto groups either in the prepolymer or in the silane to C—C double bonds offers a further route of technical interest.

Vinyl ester resins are used preferably as base polymers for adhesives. On the chemical side, vinyl ester resins possess a certain relationship to the UP resins, in particular as far as curing reaction, processing technology and field of use are concerned. These resins are polyadducts of liquid epoxy resins and acrylic acid. As a result of reduction of ester groups in the molecule chain, these resins have better hydrolysis resistance in tandem with effective elasticity and impact toughness. Monomers used for crosslinking are the same as for the unsaturated polyester resins, styrene in particular.

Acrylates are used preferably as base polymers for adhesives. The collective term "acrylate-based adhesives" encompasses all of the reactive adhesives whose curing takes place via the carbon-carbon double bond of the acrylic group.

Particular significance in adhesive formulations has been acquired by the methacrylic esters and the alpha-cyanoacrylic esters. The curing of the acrylate adhesives is accomplished by addition polymerization, in the course of which an initiator triggers a chain reaction leading to a continuous curing of adhesive. The polymerization of the "acrylate" adhesives can be initiated by means of free radicals or alternatively, in the case of the alpha-cyanoacrylates, by means of anions. In accordance with the polymerization mechanism that is utilized for curing, the acrylate adhesives are also subdivided into the following groups:

anionically curing adhesives: alpha-cyanoacrylate 1-component adhesives, free-radically curing adhesives: anaerobic 1-component adhesives, free-radically curing adhesives: 2-component adhesives In the case of the sealants based on polyacrylic esters or acrylic ester copolymers and polymethacrylic esters a distinction is made between solvent-borne and aqueous systems. Polyacrylate sealants cure physically by evaporation of the solvent or of the dispersion water.

Polyvinyl acetates are used preferably as base polymers for adhesives. Polyvinyl acetate is the product of polymerization of vinyl acetate. Owing to the strongly polar acetate group present in the molecule, polyvinyl acetate possesses very good adhesion properties to many adherend surfaces. Use is predominantly as a dispersion-based adhesive with a solids content of approximately 50% to 60%, in some cases also based on vinyl acetate copolymers (with vinyl chloride, for example).

Polyvinyl alcohols are used preferably as base polymers for adhesives.

Polyvinyl alcohol comes about as a product of hydrolysis of polyvinyl acetate and other similar polyesters. Depending on molecular weight, the polyvinyl alcohol takes the form of a liquid having a more or less high viscosity. It is used, for example, for bonding cellulosic materials, such as paper, cardboard, wood, etc., for example, and also as a protective colloid for stabilizing and increasing the setting rate of dispersion-based adhesives.

Polyvinyl ethers are used preferably as base polymers for adhesives. Among the polyvinyl ethers, the following three polymers in particular are of interest as base materials for adhesives: polyvinyl methyl ethers, polyvinyl ethyl ethers, polyvinyl isobutyl ethers The polyvinyl ethers at moderate degrees of polymerization are tacky plasticizing resins possessed of very good adhesion properties to porous and smooth surfaces. Polyvinyl methyl ether is notable in particular for the fact that, owing to its water-solubility, it can be moistened again and therefore, for example, as a mixture with dextrin or animal glues, used as a gum on label papers, endows them with improved adhesion. On account of their permanent tackiness, polyvinyl ethers are also employed in pressure-sensitive adhesives.

Ethylene-vinyl acetates, a copolymer of ethylene and vinyl acetate, are used preferably as base polymers for adhesives. In the molecular structure the vinyl acetate molecules are incorporated randomly in the ethylene chain. While the elimination of acetic acid makes the polyvinyl acetate relatively unstable under temperature load, the copolymers with ethylene are significantly more resistant in terms of oxidation and thermal degradation. For this reason, EVA copolymers with an approximately 40% vinyl acetate fraction are among an important group of base hotmelt adhesive materials.

Ethylene-acrylic acid copolymers are used preferably as base polymers for adhesives. They are copolymers of ethylene and of acrylic acid and/or acrylic esters.

These copolymers, which combine the chemical resistance of polyethylene with the good properties of the acid and/or ester moiety, represent important base polymers for hotmelt adhesives. The ester component used is preferably ethyl acrylate.

Polyvinylacetals are used preferably as base polymers for adhesives. Polyvinylacetals come about through the action of aldehydes on alcohols. The most important acetals for adhesives manufacture are polyvinylformal and polyvinylbutyral. Both serve as a plasticizing component for phenolic resin-based adhesives. Polyvinylbutyral, moreover, finds application as an adhesive film in laminated safety glass.

Polystyrenes are used preferably as base polymers for adhesives. The monomer is in use as a constituent for adhesive base materials predominantly in two areas:
as a copolymer with plasticizing monomers, particularly butadiene, for the preparation of styrene-butadiene dispersions; and as a "polymerizable" solvent for copolymerization with unsaturated polyesters.

Polyvinyl chloride is used preferably as base polymer for adhesives. It is used more particularly for plastisol adhesives, and also as a copolymer with vinyl acetate to give vinyl chloride/vinyl acetate copolymers in solvent-based adhesives, dispersion-based adhesives, heat-sealing adhesives, and as a high-frequency welding assistant.

Styrene-butadiene rubber is used preferably as base polymer for adhesives. Styrene-butadiene rubber is a typical example of a thermoplastic elastomer, combining the application properties of elastomers with those of thermoplastics. The styrene-butadiene copolymer (SBS) and the styrene-isoprene copolymer (SIS) are what are called triblock copolymers, constructed linearly of successive identical monomer units in individual blocks. The end blocks are polystyrene segments, while the middle block is polybutadiene (styrene-butadiene-styrene block copolymer, SBS) or else isoprene (styrene-isoprene-styrene block polymer, SIS).

The ratio of styrene fraction to butadiene fraction or of styrene fraction to isoprene fraction is approximately 1:3. Unlike adhesive layer polymers which owe their elastic properties to the addition of plasticizer, in this way an "internal plasticizing" is achieved. A particular advantage of these rubber copolymers is their ability to form adhesive layers having good adhesion properties and high flexibility. Significant application therefore exists in situations where the adhesively bonded adherends are subject in practical use to high deformation stresses, such as in footwear or with rubber/rubber or rubber/metal bonds, for example.

Chloroprene rubber (CR) is used preferably as base polymer for adhesives. Chloroprene rubber (polychloroprene) comes about as a polymerization product and copolymerization product of chloroprene (2-chloro-butadiene). Besides the good adhesion properties, the linear macromolecules possess a strong propensity towards crystallization, which contributes to a relatively high strength on the part of the adhesive layer. These polymers and copolymers are important base materials for contact adhesives. The double bond present within the polychloroprene molecule allows additional crosslinking to be carried out with correspondingly reactive molecule groups. Thermosetting components used for this purpose include isocyanates and phenolic resins.

Nitrile rubber (NBR) is used preferably as base polymer for adhesives. Nitrile rubber is a copolymer of butadiene with a fraction of approximately 20% to 40% of acrylonitrile. The high acrylonitrile fraction endows these polymers with effective plasticizer resistance, so making them highly suitable, for example, for the bonding of plasticized plastics.

Butyl rubber is used preferably as base polymer for adhesives. Butyl rubber is a copolymer composed of a predominant fraction of isobutylene with isoprene. Within this linear chain molecule there exist, in the form of the long polyisobutylene segments, very high chain fractions of saturated character, at which no further crosslinking is possible. The sole crosslinkable component is the isoprene molecule, and so the overall properties of the butyl rubber are determined by the fraction of the number of double bonds, predetermined by the isoprene. The reactivity can be further influenced by incorporation of monomers containing chlorine or bromine.

Polysulphides are used preferably as base polymers for adhesives. Raw materials for polysulphide sealants have long been known under the trade name Thiokol®. Polysulphide polymers are obtained by reacting dichloroethylformal with sodium polysulphide. The molecular weight of the liquid polymers is between 3000 and 4000. By reaction with an oxidizing agent, manganese dioxide for example, they can be converted into an ultimate rubber-elastic state.

Polyethylenes are used preferably as base polymers for adhesives. The low molecular mass types, with melt indices in the range from 2 to 2000 g/10 min, have found use, in combination with tackifying resins and microwaxes, as hotmelt adhesives in the paper and cardboard industry.

Polypropylenes are used preferably as base polymers for adhesives. Polypropylene is in use as a base material for hotmelt adhesives with moderate strength properties, more specifically in the form of atactic polypropylene.

Fluorinated hydrocarbons are used preferably as base polymers for adhesives. Polyfluoro-ethylene-propylene is a copolymer of tetrafluoroethylene and hexafluoro-propylene and has been studied as a base material for hotmelt adhesives. The advantage of these products lies in the high long-term temperature durability.

Polyamides are used preferably as base polymers for adhesives. The polyamides represent some of the most important base materials for the physically setting hotmelt adhesives. Suitable for the preparation of the polyamides are the reactions described below, which typically take place in the melt under a nitrogen atmosphere: polycondensation of diamines with dicarboxylic acids; polycondensation of aminocarboxylic acids; polycondensation from lactams; polycondensation of diamines with dimerized fatty acids.

Saturated polyesters and copolyesters are used preferably as base polymers for adhesives. Saturated polyesters and copolyesters come about through polycondensation from dicarboxylic acids and diols. They are an important base material for hotmelt adhesives.

Phenol-formaldehyde resins are used preferably as base polymers for adhesives. These polymers come about through a polycondensation reaction between phenol and formaldehyde, forming highly crosslinked phenolic resins which are used as a base material for adhesives for—for example—aircraft construction. Pure phenol-formaldehyde resins are generally too brittle. For this reason they are modified with thermoplastic polymers by copolymerization or cocondensation, for example with polyvinylformal, polyvinylbutyral, polyamides, epoxy resins or elastomers, for example polychloroprene and nitrile rubber.

Cresol-/resorcinol-formaldehyde resins are used preferably as base polymers for adhesives. Besides phenol as a starting monomer for formaldehyde condensations, use is also made of phenol derivatives, such as cresols and resorcinol, as co-reactants.

Urea-formaldehyde resins are used preferably as base polymers for adhesives. A large number of nitrogen-containing organic compounds are capable of polycondensation with aldehydes. For application as adhesives, urea and melamine in particular have acquired importance. With the urea-formaldehyde resins the reaction sequence takes place initially in the form of an addition reaction in weakly acidic solution. The actual polycondensation reaction, leading to the formation of the polymeric adhesive layer, results in highly crosslinked polymers via the formation either of an ether bridge or of a methylene bridge.

Melamine-formaldehyde resins are used preferably as base polymers for adhesives. Like urea, melamine as well reacts with formaldehyde to form methylol compounds. As in the case of the urea reactions, the polycondensation with these compounds too proceeds via methylene or methylene ether linkages to form high molecular mass, highly crosslinked, hard and in some cases brittle adhesive layers.

Polyimides are used preferably as base polymers for adhesives. The experiments on the use of the polyimides arise out of the concern to have organically based adhesives available for high temperature challenges. The preparation of technically utilizable polyimides is accomplished by reaction of the anhydrides of tetrabasic acids, for example pyromellitic anhydride, with aromatic diamines, for example diaminodiphenyl oxide. Use as an adhesive is accomplished starting from a precondensate, in the form of solutions or films.

Polybenzimidazoles are used preferably as base polymers for adhesives.

The polybenzimidazoles are likewise to be classed as adhesives of high heat resistance. They come about through a polycondensation reaction from aromatic tetramines with dicarboxylic acid.

Polysulphones are used preferably as base polymers for adhesives. The polysulphones likewise belong to the group of heat-resistant adhesives. They are obtained, for example, through a polycondensation reaction from dihydroxydiphenyl sulphone with bisphenol A.

The adhesives of the invention are used preferably in casting compounds, which are used as a coating in the electrical and electronics industries.

It was surprising that the silicas described could be incorporated more rapidly into the adhesives of the invention and, despite high levels of filling, there were no disadvantages observed in respect of the viscosity and the processability of the adhesives.

The invention further provides for the use of silanized, structurally modified, pyrogenically prepared silicas containing on their surface fixed vinyl groups or vinylsilyl groups, with hydrophobic groups, such as trimethylsilyl and/or dimethylsilyl and/or monomethylsilyl, additionally being fixed on the surface, in adhesives.

The examples which follow are intended to elucidate the invention in greater detail.

EXAMPLES

Example 1

Preparation of the Silanized Structurally Modified Silica

The preparation is carried out using the pyrogenically prepared silicas, or silicas from Table 1. The surface modifiers used, for example, in the case of silica 4 from Table 2 are vinyltriethoxysilane and hexamethyl-disilazane. Further details on the surface modifier used can be found in Table 2. The silica is charged to a mixer and sprayed—with intense stirring—first with water and then with the organosilanes. When spraying is at an end, mixing is continued for 15 to 30 minutes more, followed by heat treatment at 100 to 160° C. for 1 to 3 hours. The heat treatment may also take place under inert gas, such as nitrogen.

The structural modification of the silanized silicas is accomplished by mechanical action in a continuously operating ball mill with optional subsequent grinding. Grinding may also be followed by heat treatment. Grinding is accomplished by means of an air-jet mill, toothed-disc mill or pinned-disc mill. Heat treatment takes place batchwise in a drying oven or may take place continuously in a fluidized-bed or fluid-bed dryer. Table 2 below shows the reaction conditions of the individual silicas used from Table 1.

Preparation of the Comparison Silica 2 kg of AEROSIL® are charged to a mixer and sprayed—with intense mixing—first with 0.1 kg of water and then with a mixture of 0.4 kg of hexamethyldisilazane and 0.17 kg of vinyltriethoxysilane. When spraying has ended, mixing is continued for 15 minutes more and the reaction mixture is heat-treated initially for 5 hours at 50° C. and then for 1 hour at 140° C.

The physicochemical characteristics of the silanized silicas obtained can be found in the following Table 3.

TABLE 2

Reaction conditions for the silanization of the pyrogenic silica

| Identification | Silica used | Amount of water (parts/ 100 parts silica) | SM*) (parts/ 100 parts silica) | Temperature treatment 1st stage Temp. [° C.]/ Duration [h] | Temperature treatment 2nd stage Temp. [° C.]/ Duration [h] | Grinding**) | Temperature treatment***) Temp. [° C.]/ Duration [h] |
|---|---|---|---|---|---|---|---|
| S1 | AEROSIL® 200 | 5 | A/5 D/5 | 140/2 | — | no | no |
| S2 | AEROSIL® 300 | 5 | B/15 C/1.8 | 20/2 | 140/2 | yes | yes |
| S3 | AEROSIL® 300 | 5 | A/8.5 B/20 | 50/5 | 140/1 | yes | 120/2 |
| S4 | AEROSIL® 300 | 5 | A/16 B/12 | 20/6 | 120/5 | yes | 120/3 |
| S5 | AEROSIL® 150 | 5 | C/20 | 130/2 | — | yes | 120/2 |
| S6 | AEROSIL® 130 | 2 | C/5 D/5 | 150/3 | — | no | no |
| S7 | AEROSIL® 300 | 5 | A/8.5 B/20 | 50/5 | 140/1 | no | no |
| S8 | AEROSIL® 200 | 5 | B/10 C/5 | 20/20 | 140/3 | yes | no |
| S9 | AEROSIL® 300 | 5 | C/16 | 20/2 | 140/2 | yes | no |

TABLE 2-continued

Reaction conditions for the silanization of the pyrogenic silica

| Identification | Silica used | Amount of water (parts/ 100 parts silica) | SM*) (parts/ 100 parts silica) | Temperature treatment 1st stage Temp. [° C.]/ Duration [h] | Temperature treatment 2nd stage Temp. [° C.]/ Duration [h] | Grinding**) | Temperature treatment***) Temp. [° C.]/ Duration [h] |
|---|---|---|---|---|---|---|---|
| S10 | AEROSIL ® 200 | 2 | A/10 B/5 | 20/2 | 140/24 | yes | 120/2 |
| S11 | AEROSIL ® 300 | 5 | A/8.5 B/20 | 50/5 | 140/1 | yes | no |

*)SM = surface modifier: A = vinyltriethoxysilane, B = hexamethyldisilazane, C = 1,3-divinyl-1,1,3,3-tetramethyldisilazane, D = methyltrimethoxysilane. Mixtures were used when using a plurality of SMs
**)Grinding = grinding after structural modification
***)Temperature treatment = temperature treatment after grinding

TABLE 3

Physicochemical data of the silanized silicas obtained after structural modification and of the unmodified comparison silicas

| Identification | Tapped density [g/l] 2) | Loss on drying [%] 3) | Loss on ignition [%] 4), 6) | pH 5) | Carbon content [%] | DBP adsorption [%] | BET specific surface area [m$^2$/g] 1) |
|---|---|---|---|---|---|---|---|
| Comparison silica | 48 | 0.9 | 4.1 | 9.0 | 4.0 | n.d. | 197 |
| S1 | 236 | 1.2 | 1.6 | 4.4 | 1.1 | 9.7 | 136 |
| S2 | 147 | 0.7 | 3.8 | 6.2 | 3.8 | n.d. | 201 |
| S3 | 120 | 0.4 | 3.6 | 7.5 | 4.0 | n.d. | 191 |
| S4 | 132 | 0.5 | 3.0 | 5.2 | 3.5 | 128 | 189 |
| S5 | 138 | 0.2 | 2.8 | 5.5 | 2.8 | n.d. | 103 |
| S6 | 249 | 0.8 | 1.1 | 6.3 | 1.5 | 91 | 79 |
| S7 | 266 | 1.1 | 3.4 | 8.5 | 4.0 | 121 | 204 |
| S8 | 161 | 0.9 | 2.7 | 6.1 | 4.3 | 91 | 117 |
| S9 | 132 | 1.0 | 4.0 | 6.7 | 4.9 | n.d. | 205 |
| S10 | 149 | 0.6 | 2.8 | 5.1 | 2.8 | n.d. | 155 |
| S11 | 163 | 0.8 | 3.5 | 8.5 | 4.0 | n.d. | 197 |

1) DIN 66131
2) DIN ISO 787/XI, JIS K 5101/18 (unsieved)
3) DIN ISO 787/II, ASTM D 280, JIS K 5101/21
4) DIN 55 921, ASTM D 1208, JIS K 5101/23
5) DIN ISO 787/IX, ASTM D 1208, JIS K 5101/24
6) based on the substance dried at 105° C. for 2 hours Example 2

Rheological Properties

In Example 2 the rheological properties of the structurally modified, pyrogenic silicas used are determined in the epoxy resin Renlam M1 (Huntsman). The respective viscosities with comparison products and with the structurally modified silicas used in the invention are ascertained. The viscosities are measured before and after addition of the silica.

The determination of the rheological properties takes place in accordance with the method described below.

167.5 g of Renlam M-1 and 10 g of silica are weighed out into a 350 ml beaker and the dissolver disc is immersed completely. Then the silica is homogenized at a speed n1 of 1000 rpm, with the lid closed, until it has been fully incorporated. As soon as the silica has been fully incorporated, the speed is increased to n2=3000 rpm and dispersion is carried out for 3 minutes under vacuum. The viscosity is determined using a Brookfield DV III rheometer. The viscosity values reported were obtained at room temperature, 25° C. Measurement is made at 2.5 rpm using a No. 7 spindle.

Table 4 below shows the results.

TABLE 4

| | Rheological properties | |
|---|---|---|
| Silica from Table 6 | Viscosity at 25° C. following addition [mPas] | Initial mass of silica [g/% by weight] |
| Comparison silica | 104 000 | 10/5.6 |
| S 4 | 28 800 | 10/5.6 |

From Table 4 it is apparent that the viscosity of the comparison silica when added to the epoxy resin increases very considerably. In comparison with this, the addition of the silicas S 4 produces a marked lower viscosity of the epoxy resin. The experiment shows that, even at high levels of filling, the rheological properties of the epoxy resins are not adversely affected, and there is no thickening, as a person skilled in the art would have expected from the prior art.

Example 3

Attitude to Incorporation into Polyester Adhesive Resin 100 g of Palatal A 410 (polyester resin, Büfa) are weighed out into a 350 ml beaker and conditioned to 25° C. in a water bath. The beaker is inserted into the aluminium insert of the mounting apparatus of the dissolver. The stirrer is immersed to the target depth of t=10 mm above the base of the beaker, and is switched on at a speed n of 500 min$^{-1}$. 3 g of silica are placed uniformly onto the resin surface, and the stopwatch is started. A measurement is made of the time required for the silica to be homogenized in the resin.

Table 5 shows the results.

TABLE 5

| Attitude to incorporation | |
|---|---|
| Silica | Incorporation time [sec] |
| Comparative example | 196 |
| S 4 | 58 |

The inventive silica S 4 can be incorporated very rapidly into Palatal A 410, within 58 sec. For complete incorporation, in contrast, the comparative example requires a time of 196 sec. Hence a time saving is produced of approximately 30%.

The invention claimed is:

1. An adhesive comprising a silanized, structurally modified, pyrogenically prepared silica having a tapped density of at least 120 g/l as measured by DIN ISO 787/XI, JIS K 5101/18 (unsieved) containing on its surface fixed vinyl groups or vinylsilyl groups, with hydrophobic groups additionally being fixed on the surface.

2. The adhesive according to claim 1, wherein said adhesive comprises 1% to 40% by weight of said silanized, structurally modified, pyrogenically prepared silica.

3. The adhesive according to claim 1, wherein said adhesive comprises at least one base polymer selected from the group consisting of epoxy resins, unsaturated polyester resins, polyurethane, silane-terminated polymers, vinyl ester resins, acrylates, polyvinyl acetate, polyvinyl alcohol, polyvinyl ethers, ethylene-vinyl acetate, ethylene-acrylic acid copolymers, polyvinyl acetates, polystyrene, polyvinyl chloride, styrene-butadiene rubber, chloroprene rubber, nitrile rubber, butyl rubber, polysulphide, polyethylene, polypropylene, fluorinated hydrocarbons, polyamides, saturated polyesters and copolyesters, phenol-formaldehyde resins, cresol-/resorcinol-formaldehyde resins, urea-formaldehyde resins, melamine-formaldehyde resins, polyimides, polybenzimidazoles, polysulphones or mixtures thereof.

4. The adhesive according to claim 1, wherein said silanized, structurally modified, pyrogenically prepared silica is in a casting compound based on an epoxy resin, said compound being admixed to the adhesive.

5. The adhesive according to claim 1, wherein said adhesive further comprises at least one additive selected from the group consisting of solvents, water, fillers, thixotropic agents, adhesion promoters, colour pastes, catalysts and/or ageing inhibitors.

6. The adhesive of claim 1, wherein said hydrophobic groups are at least one selected from the group consisting of trimethylsilyl, dimethylsilyl and monomethylsilyl.

7. A method of preparing an adhesive comprising adding to an adhesive, a silanized, structurally modified, pyrogenically prepared silica containing on its surface fixed vinyl groups or vinylsilyl groups, with hydrophobic groups additionally being fixed on the surface.

8. The adhesive according to claim 1, wherein said adhesive comprises 2% to 30% by weight of said silanized, structurally modified, pyrogenically prepared silica.

9. The adhesive according to claim 1, wherein said adhesive comprises 4% to 10% by weight of said silanized, structurally modified, pyrogenically prepared silica.

10. The adhesive according to claim 1, wherein said silica is structurally modified by mechanical action.

11. The adhesive according to claim 1, wherein said silica is structurally modified by at least one of a ball mill and a continuously operating ball mill.

* * * * *